Nov. 17, 1942.    G. HAGEDORN    2,302,119
ELECTRIC WELDING
Filed Sept. 13, 1939    2 Sheets-Sheet 1

Inventor,
Gerhard Hagedorn
By: Glascock, Downing & Seebold
Attorneys.

Nov. 17, 1942.  G. HAGEDORN  2,302,119
ELECTRIC WELDING
Filed Sept. 13, 1939   2 Sheets—Sheet 2

Inventor,
Gerhard Hagedorn
Glascock Downing & Seebold
By: Attorneys.

Patented Nov. 17, 1942

2,302,119

UNITED STATES PATENT OFFICE 2,302,119

ELECTRIC WELDING

Gerhard Hagedorn, Berlin-Halensee, Germany; vested in the Alien Property Custodian Application September 13, 1939, Serial No. 294,749
In Germany December 7, 1935

14 Claims. (Cl. 171—119)

The invention relates to electric welding and more particularly to apparatus for producing short current impulses in a welding plant connected to a source of direct or alternating current. This application is a continuation-in-part of application Serial No. 114,311, filed Dec. 5, 1936.

In the art of electric resistance welding the present invention is of particular importance for the reason that in such welding very specific conditions must be complied with. The problem resides in providing the possibility of switching on and off on the primary side extremely large currents of say 1000 amperes and more and this furthermore in very short time intervals. Difficulties are encountered in frequently and rapidly switching on and off such large currents, and it is one object of the present invention to overcome these difficulties. One drawback in known apparatus, when operating with the above mentioned large currents is that mechanical switches are destroyed in a very short time by great arc formation. This difficulty is overcome in the present invention by having the primary side of the welding transformer short circuited by a switch, while simultaneously with, or shortly before or after this, short circuiting means are switched in for reducing or suppressing the short circuit current. Only after the heavy current is absorbed in this manner the main switch and the short circuiting switch are opened again and the means for reducing or suppressing the short circuit current are switched out. For producing welded seams or a sequence of spot welds the above mentioned switching sequence is repeated periodically.

The reduction or suppression of the short circuit current can be effected in many different ways. For instance shortly before or after, or simultaneously with the setting up of the short circuit a resistance or impedance can be inserted in the lead from the short circuiting point to the source of current. When the welding plant is operated with alternating current a choking coil is advantageously used as impedance.

In the operation of the welding plant with direct or alternating current generators it is sometimes advantageous with the object of avoiding loss to effect the reduction or suppression of the short circuit current by reducing or completely removing the terminal voltage of the generator supplying the current. To reduce the time taken for the current to die down it is also possible to reverse the exciter or the field excitation of the welding generator.

In welding plant which is operated by direct or alternating current generators the short circuit current produced by short circuiting the welding device can moreover be utilized to deprive the welding generator of excitation. In such a case also reduction or suppression of the short circuit current takes place.

The cutting off of the excitation can be undertaken either in the welding generator or alternator itself or in its exciter or even in the secondary exciter if the exciter itself is separately excited.

In a preferred manner of carrying the invention into practice the opening and closing of the switches and the switching of the resistances or chokes are carried out by automatic control means operating in dependence on each other. Any suitable known switching means can be used for control such as drum switches, knife switches, relays, and the like.

In the case of welding plants with a transformer for direct connection to the supply mains as well as that of plants which are operated by means of their own direct current generator or alternator it is possible to use as switch in the main circuit and also as short circuiting switch for the welding device one or more discharge switching devices which are controlled in dependence on each other by switch members such as drum switches. For the discharge device switches it is preferable to use discharge devices provided with an igniting or striking device or with grids. The drum switches could in such a case control the striking device or the grids. The use of discharge device switches, such as vapour discharge devices, offers the advantage that the life of the whole plant is considerably increased in comparison with such as are operated only with mechanical switches.

In all constructional forms of the invention in which a transformer is used, it is advantageous to carry out the switching processes in the primary circuit of the transformer.

In an arrangement particularly suitable for carrying out the invention a welding transformer is provided with a switch in the primary circuit and has connected in parallel to the primary a short circuit lead containing a short circuiting switch. The transformer primary is connected to an alternator, which may be of medium or high frequency and is coupled mechanically to an exciter for the alternator field and to a driving motor. A rheostat is provided for regulating the exciter field and the latter can be switched on by means of a switch and if desired can be reversed by means of a change-over switch. The alternator field likewise has a regulating rheostat and can also be switched on by means of a further switch and if desired can be reversed by a change-over switch.

In another arrangement in accordance with the invention the welding generator or alternator or its exciter has an opposed field winding which is fed with the short circuit current through a transformer or a shunt and a rectifier. If desired the usual field winding and the opposed field winding can be replaced by a single winding which is switched over in turn.

Such an arrangement may also comprise drum switches in the primary circuit of the welding transformer, in the short circuiting shunt and in the exciter circuit, which are driven from a common shaft rotating in synchronism with the welding generator.

In a particular embodiment of the invention two drum switches connected in series and driven from the common shaft or from the machine shaft are provided in the field circuit of the generator. One of the drum switches is connected to the common driving shaft through change speed gear and is provided with one fixed and one shifting contact brush.

Where alternators are used as source of current medium or high frequency alternators are particularly suitable such as machines which generate at a frequency above the usual supply frequency of 50 or 60 cycles. It is advantageous to use alternators providing a frequency of over 100 cycles and it may be desirable to use alternators running at a frequency of over 200 cycles up to 2,000 cycles and more. In special cases it is even possible to go up to 100,000 cycles with the frequency to be used. The frequency supplied in any case depends on the desired shortness of the welding periods.

For many welding purposes, as in welding light metal such as aluminium, very short welding periods are necessary if it is desired to ensure clean, fast welding without modifying the properties of the welded material and at the same time to secure high efficiency. In such cases welding periods of $\frac{1}{10}$ and even $\frac{1}{100}$ to $\frac{1}{1000}$ of a second are necessary, but short periods like these can be achieved by applying the method or the arrangement of the present invention, particularly with the use of medium and high frequency alternators.

These and other objects and features of the invention will appear more fully in the following description taken in connection with the accompanying drawings forming part hereof, and in which.

Figure 1:
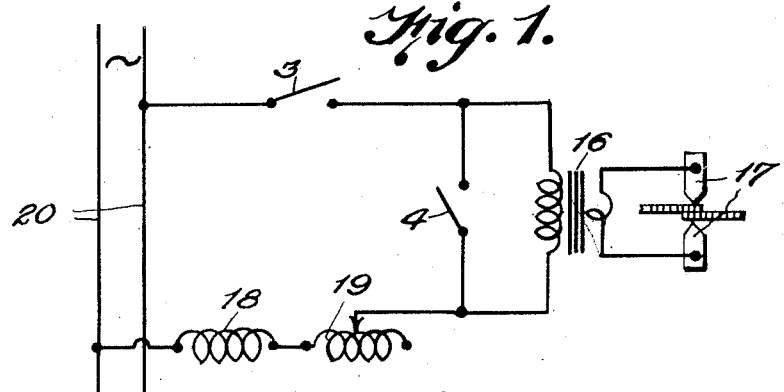
Figure 1 shows diagrammatically a circuit for electrical resistance welding plant with a welding transformer connected direct to the supply mains.

Figure 1 represents a circuit diagram of an electrical resistance welding plant with a welding transformer adapted to be connected direct to the supply mains. 3 is the main switch and 4 the short circuiting switch, while 16 denotes the transformer, 17 the electrodes at the welding position, 18 a fixed protecting choke for limiting the short circuit current and 19 an adjustable choke. The reference 20 designates the alternating current supply mains. The main switch 3 is first closed so that the welding transformer 16 and with it the welding electrodes 17 may receive current. After the desired welding period has elapsed the short circuiting switch 4 is closed and at the same time, or shortly before or afterwards, the choking coil 19 is switched in by means not shown. Thereupon the switches 3 and 4 are opened again, the choking coil 19 cut out and the process can begin afresh.

Figure 2:
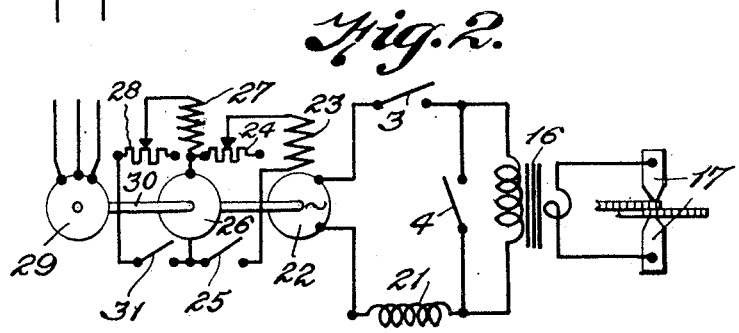
Figures 2 and 3 show diagrammatically two circuits for electrical resistance welding plant each with its own set of machines.

Figure 2 shows a circuit diagram for electrical resistance welding plant incorporating a motor generator set. Here again 3 is the main switch, 4 the short circuiting switch; 16 is the welding transformer, which is normally provided with an iron core; 17 are the electrodes at the welding position; 21 is a fixed choking coil, 22 is the welding alternator, which may be a high frequency alternator, with the field winding 23. 24 denotes a rheostat in the main field circuit, 26 the exciter, 27 the field winding of the exciter, 28 a rheostat in the exciter field circuit and 31 a switch in the same circuit. 29 is the driving motor, 30 the common driving shaft for the exciter 26 and the welding alternator 22.

For producing short current impulses at the welding position the switch 31 for cutting in the exciter field is closed, thereupon the switch 25 for the excitation of the welding generator 2 is closed and then the main switch 3 in the primary circuit of the transformer, whereupon after the desired welding period has elapsed the short circuiting switch 4 is closed and shortly beforehand simultaneously, or shortly thereafter, the field winding 23 of the welding alternator 22 is switched out either direct by opening the switch 25 or indirectly by opening the switch 31.

Figure 3:
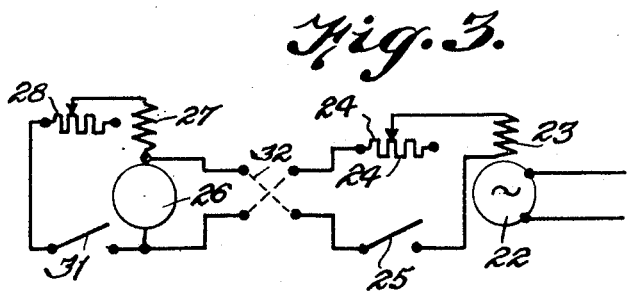

It is also possible to insert reversing switches in the exciter field circuit or in the main field circuit of the welding alternator or both. Figure 3 shows as a modification of a part of Figure 2 how such a reversing switch can be applied to the circuit just described. 32 is the reversing switch and 23 the main field winding of the welding alternator; 25 being the main field switch of the welding alternator. 24 denotes the main field rheostat, 26 the exciter, 27 the exciter field winding, 28 the exciter field rheostat and 31 the exciter field switch.

The various switches 3, 4, 25 and 31 and the reversing switch 32 should be controlled in mutual dependence to provide the desired operation, and the correct time sequence can be ensured by suitable mechanical or electrical coupling members or by time switches of known construction.

Figure 4:
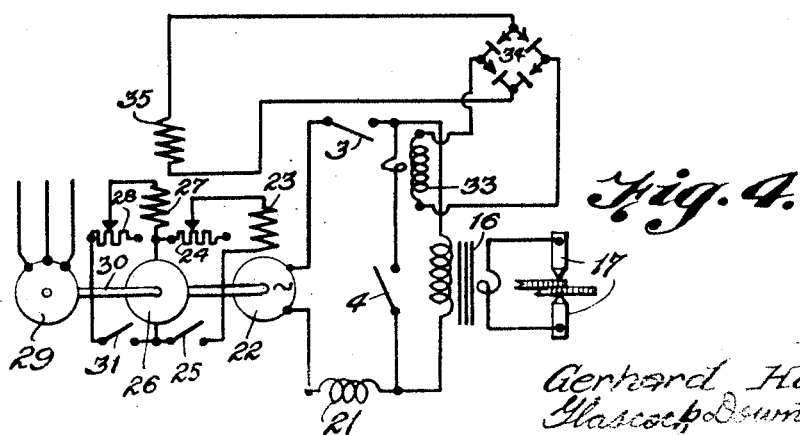
Figures 4 and 5 are circuit diagrams of electrical resistance welding plant incorporating machine sets in which the short circuit current is used to deprive the generator of excitation, the arrangement of Figure 5 being operated by synchronized drum switches.

Figure 4 shows a circuit diagram for electrical resistance welding plant including a motor generator set. As before 3 is the main switch, 4 the short circuiting switch, 16 the welding transformer, which is normally provided with an iron core, 17 the electrodes at the welding position and 21 a fixed choking coil. The welding alternator 22 may be a high frequency alternator having the field winding 23, while 24 is its main field rheostat. 25 denotes a switch in the main field circuit, 26 the exciter, 27 the field winding of the exciter, 28 the exciter field rheostat and 31 a switch in the exciter field circuit. 29 is the driving motor, 30 is a common driving shaft for the exciter 26 and the welding alternator 22. The feature of the invention now being described is to insert in the short circuiting path containing the switch 4 a transformer 33 having its secondary winding connected through a rectifier 34, preferably a dry rectifier, to an opposed field winding 35 on the exciter 26.

With the short circuiting switch 4 and the main switch 3 closed and the switch 31 in the exciter field current open the exciter is very rapidly deprived of excitation by the current flowing in the opposed field winding 35. By this means the result is achieved that the switching periods can be considerably shortened, so that a higher welding speed can be attained.

Figure 5:
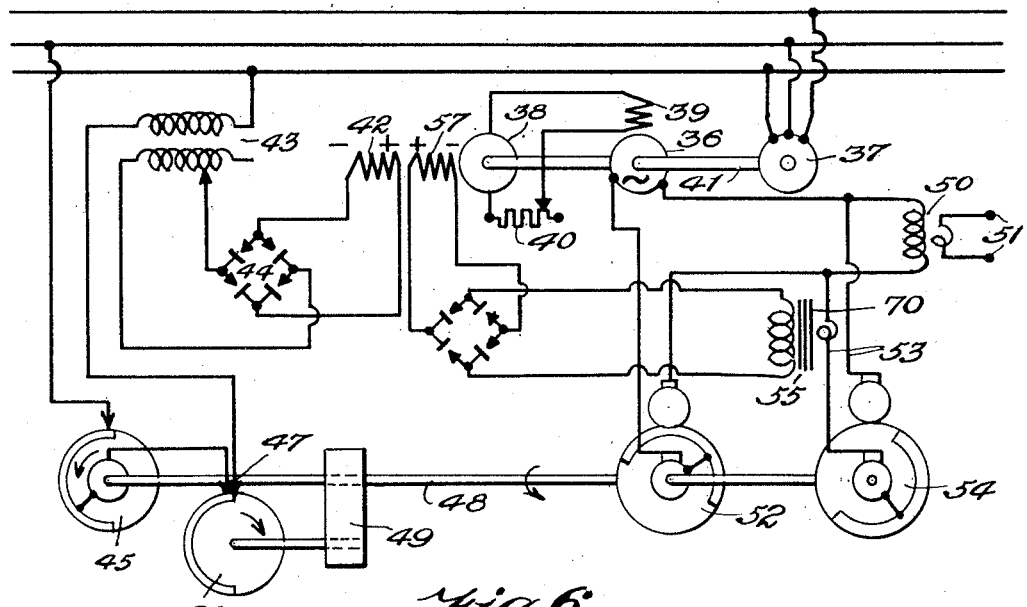

Figure 5 likewise shows a welding plant constructed in accordance with the invention in which the various switching and control members are shown. In this arrangement the welding alternator 36 is driven by a motor 37 fed from the supply mains. 38 is the exciter which supplies the field windings 39 of the welding alternator through a rheostat 40. The driving motor, welding alternator and exciter can be arranged as shown on a common shaft 41. 42 is the exciter field which is fed through a transformer 43 connected to the supply mains and a rectifier 44. 45 and 46 are two drum switches connected in series in the exciter field circuit. One of these switches 46 is provided with a movable brush 47 for regulating the duration of excitation. In the position of the brush 47 shown in the drawing and with the same speed of the drums 45 and 46 excitation takes place and welding energy is transformed at each revolution of a shaft 48, upon which the drum 45 is mounted and which preferably rotates in synchronism with the welding alternator. With the switch drum 46 running at half the speed of the drum 45 and with the brush 47 shifted by 90° energy is on the contrary provided only at every second revolution of the shaft 48. The switch drum 46 is then advantageously driven by change speed gear 49 from the shaft 48. Instead of drum switches other switching members can be used, such as contactors, cam switches or the like.

The welding transformer 50 with the secondary terminals 51 for the electrodes has its primary connected to the welding alternator 36. In the primary circuit of the welding transformer there is a drum switch 52 which is likewise mounted on the driving shaft 48. 53 is the short circuiting conductors which are shunted across the primary of the welding transformer 50. 54 is the short circuiting drum switch also mounted on the driving shaft 48. By means of this arrangement the switches 45, 52 and 54 are operated in a simple manner in dependence on each other. Moreover, while the times of switching on and off may be so arranged that the alternating currents are switched approximately during their passage through zero, yet it is preferred to operate as already described in order to properly obtain the full advantages of the theory of the invention which will be equivalent to the results obtained when operating with direct current.

In the short circuiting lead 53 the transformer 55, is inserted. Its secondary winding feeds the reverse field coil 57 of the exciter 38 through a rectifier 56, preferably a dry rectifier. The transformer 55 is advantageously so designed that its iron core 70 is highly over-saturated by the short circuit current of the alternator. In this way the result is achieved that down to small short circuit currents a relatively high voltage is applied to the opposed field winding, and the inductance of the transformer on short circuits remains so small that only an inconsiderable residual voltage remains on the welding transformer.

In operation the primary circuit of the welding transformer 50 is switched in by the drum switch 52 after the exciter field winding 42 has previously been cut in by the switches 45 and 46. Shortly before the end of the welding period and immediately before short circuiting the welding transformer 50, the field winding 42 is disconnected from the supply by the switch 45, whereupon the short circuit 53 connected across the primary side of the welding transformer is closed by the drum switch 54. At this instant there is applied to the opposed field winding 57 a voltage which, produced by the transformer 55 and the rectifier 56, very rapidly destroys the exciter field. In this way it is possible to deprive the whole set of machines very rapidly of excitation without the necessity of switching off substantial powers. This arrangement thus provides that on short circuit the exciter is very rapidly deprived of excitation, so that the welding speed can be greatly increased. The short circuit current of the welding generator is in this way made available for use in an advantageous manner.

Figure 6:
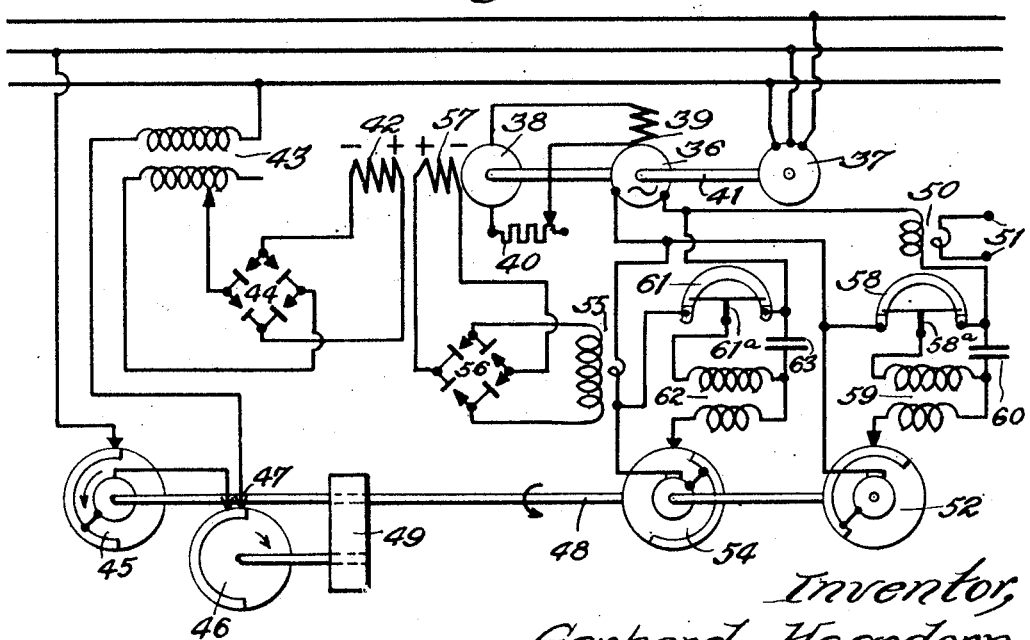
Figure 6 is a further circuit diagram of welding plant incorporating its own machine set in which discharge devices are used for switching.

In Figure 6 a similar circuit diagram to that of Figure 5 is shown. 37 designates the driving motor, 38 the exciter, 36 the alternator, which may be a medium or high frequency alternator for a frequency lying within the range of about 60 to 10,000 cycles. 50 is the welding transformer provided with the secondary terminals 51, while 55 is a transformer with the primary winding thereof arranged in the circuit for shunting the transformer 50. 52 is a drum switch which controls a discharge device switch 58 arranged in the primary circuit of the welding transformer 50 by means of a striking or igniting device consisting of striking electrodes 58a, a striking transformer 59 and a condenser 60 required for phase adjustment. 54 is another drum switch which controls a second discharge device 61 arranged in the shunting circuit of the welding transformer 50 by means of a similar striking device comprising the striking electrodes 61a, the striking transformer 62 and the condenser 63.

42 again denotes the field winding for the exciter 38, while 44 represents the rectifier, preferably a dry rectifier, and 43 the transformer connected to the supply mains for feeding the exciter field winding 42. 45 and 46 are again two drum switches connected in series in the primary of the transformer 43 feeding the field circuit of the exciter 38, of which the switch 46 is provided with a movable brush 47 for regulating the periods of excitation or the operating intervals between the welding operations. 48 is the common shaft on which the switches 52, 54 and 45 are arranged and from which the switch 46 is driven by means of the transmission gear 49. The opposed field winding is designated 57 and is fed as in the case of the form shown in Figure 5 through the rectifier 56 connected to the transformer 55. The operation of the plant shown in Figure 6 is the same as that of the form shown in Figure 5, the only difference being the form of main and short circuiting switches used.

Having now fully described my invention I claim:

1. In electric spot welding apparatus, a transformer having a primary winding and a secondary winding, a generator having a field winding, a load circuit including said secondary winding, a primary circuit including a switch for impressing the voltage of said generator across said primary winding, means for exciting the field winding of said generator, means including a switch for short circuiting said primary winding, and means for eliminating the field exciting means of said generator when the switch for short circuiting said primary winding is closed.

2. In electric spot welding apparatus, a transformer having a primary winding and a secondary winding, a generator having a field winding, a load circuit including said secondary winding, a primary circuit including a switch for impressing the voltage of said generator across said primary winding, a source of current exciting said field winding, means including a switch for short circuiting said primary winding, and means for eliminating the excitation of said field winding when the switch for short circuiting said primary winding is closed.

3. In electric spot welding apparatus, a transformer having a primary winding and a secondary winding, a generator having a field winding, a load circuit including said secondary winding, a primary circuit including a switch for impressing the voltage of the generator across said primary winding, an exciter having a field coil for supplying current to the field winding of said generator, a second field coil associated with said exciter and opposing the first field coil, a shunting circuit including a switch for short circuiting said primary winding, a second transformer having a primary winding arranged in said shunting circuit and a secondary winding, and means for impressing the voltage of the secondary winding of the second transformer across the second field coil of said exciter when said switch for short circuiting the primary winding of the first transformer is closed.

4. In electric spot welding apparatus, a transformer having a primary winding and a secondary winding, a generator having a field winding, a load circuit including said secondary winding, a primary circuit including a switch for impressing the voltage of said generator across said primary winding, an exciter having a field coil for supplying current to the field winding of said generator, a second field coil associated with said exciter opposing the first field coil, a shunting circuit including a switch for short circuiting said primary winding, a second transformer having a primary winding arranged in said shunting circuit and a secondary winding, means for impressing the voltage of the secondary winding of the second transformer across said second field coil of said exciter when the switch for short circuiting the primary winding of the first transformer is closed, and means for actuating said switches in sequence.

5. In electric welding apparatus, a transformer having a primary winding and a secondary winding, a generator having a field winding, a load circuit including said secondary winding, a circuit for impressing the voltage of the generator across said primary winding, an exciter for supplying current to the field winding of said generator, a field winding for said exciter, a second field winding for said exciter opposing the first field winding of the exciter, a shunt circuit for said primary winding, a second transformer having a primary winding arranged in said shunt circuit, a secondary winding for the second transformer, an iron core for said second transformer designed to be over-saturated when current flows in the shunt circuit at full voltage of said generator, and means for impressing the voltage of the secondary winding of the second transformer across the second field winding of said exciter.

6. In electric welding apparatus, a transformer having a primary winding and a secondary winding, an alternating current generator having a field winding, a load circuit including said secondary winding, a circuit for impressing the voltage of the generator across said primary winding, an exciter supplying current to the field winding of said generator, a field winding for said exciter, a second field winding for said exciter opposing the first field winding of the exciter, a shunt circuit for the primary winding of the transformer, a second transformer having a primary winding arranged in said shunt circuit, a secondary winding for the second transformer, a circuit for impressing the voltage of the secondary winding of the second transformer across the second field winding of said exciter, and rectifying means in said last mentioned circuit.

7. In electric welding apparatus, a transformer having a primary and a secondary, a generator having a field winding, a load circuit including the secondary of said transformer, a circuit for impressing the voltage of said generator across the primary of the transformer, an exciter supplying current to the field winding of the generator, a field winding for the exciter, a second field winding for the exciter opposing the first field winding of the exciter, a shunt circuit for short circuiting the primary of the transformer, and means for energizing the second field winding of the exciter when current flows in said shunt circuit.

8. In electric welding apparatus, a transformer having a primary and a secondary, a generator having a field winding, a load circuit including the secondary of said transformer, a circuit for impressing the voltage of said generator across the primary of the transformer, an exciter supplying current to the field winding of the generator, a field for said exciter, a shunt circuit for short circuiting the primary of the transformer, and means for neutralizing the field of said exciter when current flows in said shunt circuit.

9. In electric welding apparatus, a transformer having a primary and a secondary, a generator having a field winding, a load circuit including the secondary of said transformer, a circuit for impressing the voltage of said generator across the primary of the transformer, an exciter supplying current to the field winding of the generator, a field winding for said exciter, means for energizing the field winding of said exciter, a circuit for shunting the primary of said transformer, and magnetic means for bucking the field winding of said exciter when current flows in said shunt circuit.

10. In electric welding apparatus, a transformer having a primary winding and a secondary winding, a generator, a field winding for said generator, a load circuit including the secondary winding of the transformer, a circuit for impressing the voltage of said generator across said primary winding, an exciter supplying current to said field winding, means for short circuiting the primary winding of the transformer, and means responsive to the short circuiting of the primary winding of the transformer for suppressing the voltage of said exciter.

11. In electric welding apparatus, a transformer, a generator having a field winding, a load circuit connected to said transformer, a second circuit for impressing the voltage of said generator across said transformer, an exciter supplying current to the field winding of the generator, a field winding for the exciter, a second field winding for said exciter opposing the first field winding of the exciter, a shunt circuit for short circuiting the second circuit, and means operably responsive to the flow of current in said shunt circuit for energizing the second field winding of the exciter.

12. In electric welding apparatus, a transformer, a generator having a field winding, a load circuit connected to said transformer, a second circuit for supplying the current of said generator to the transformer, an exciter supplying current to the field winding of the generator, a field for said exciter, a shunt circuit for short circuiting said second circuit, and means operably responsive to the flow of current in said shunt circuit for eliminating the field of said exciter.

13. In electric welding apparatus, a transformer having a primary winding and a secondary winding, a generator, a field winding for said generator, a load circuit including the secondary winding of the transformer, a circuit for impressing the voltage of said generator across said primary winding, an exciter supplying current to said field winding, means for short circuiting the primary winding of the transformer, and means operating in a timed relation to the means for short circuiting the primary winding of the transformer for eliminating the voltage of said exciter.

14. In electric welding apparatus, a transformer having a primary winding and a secondary winding, a generator, a field winding for said generator, a load circuit including the secondary winding of the transformer, a circuit for impressing the voltage of said generator across said primary winding, means for exciting said field winding, means for shunting the primary of the transformer, and means operating in timed relation to the means for shunting the primary of the transformer for eliminating the excitation of said field winding.

GERHARD HAGEDORN.